Patented May 24, 1927.

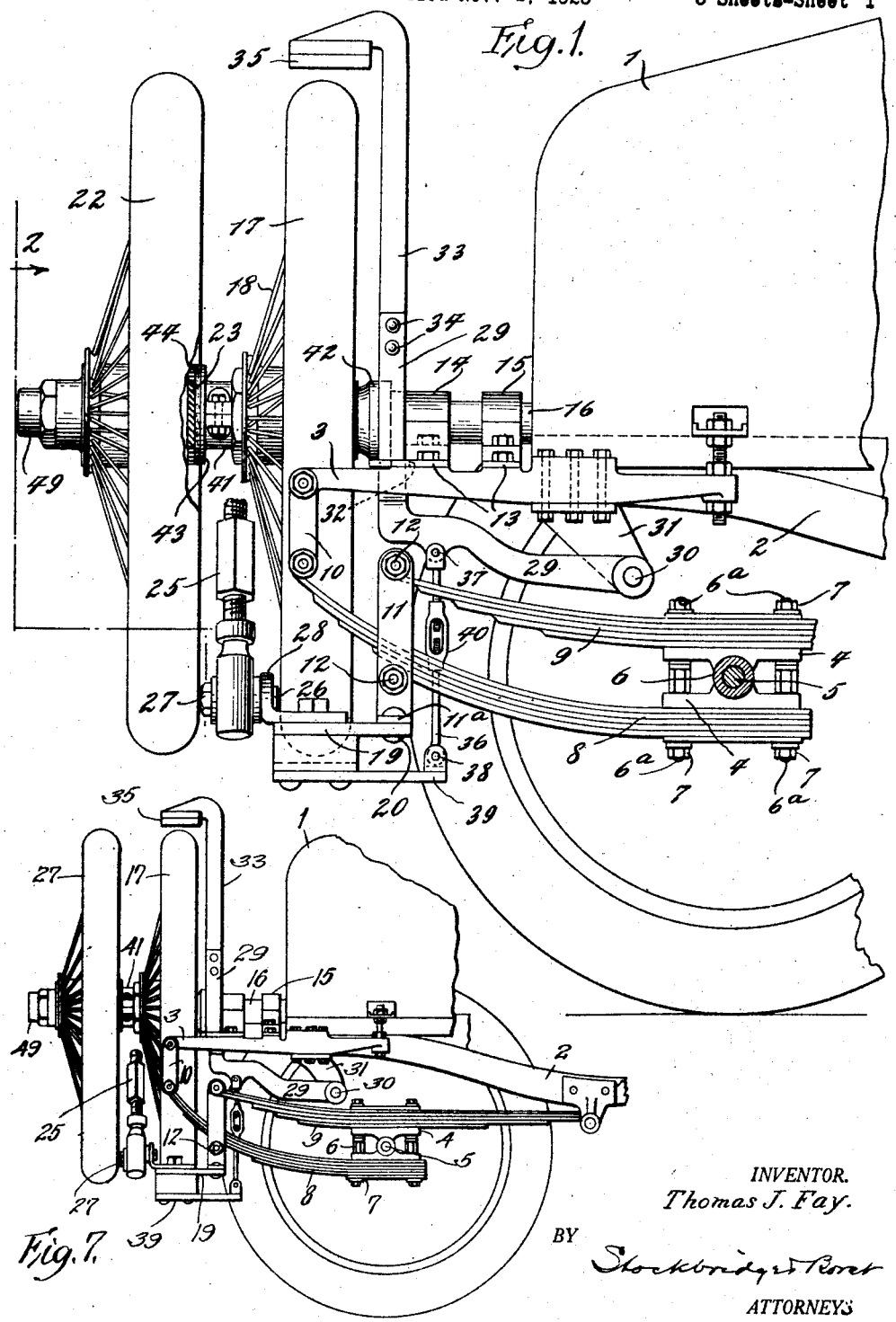

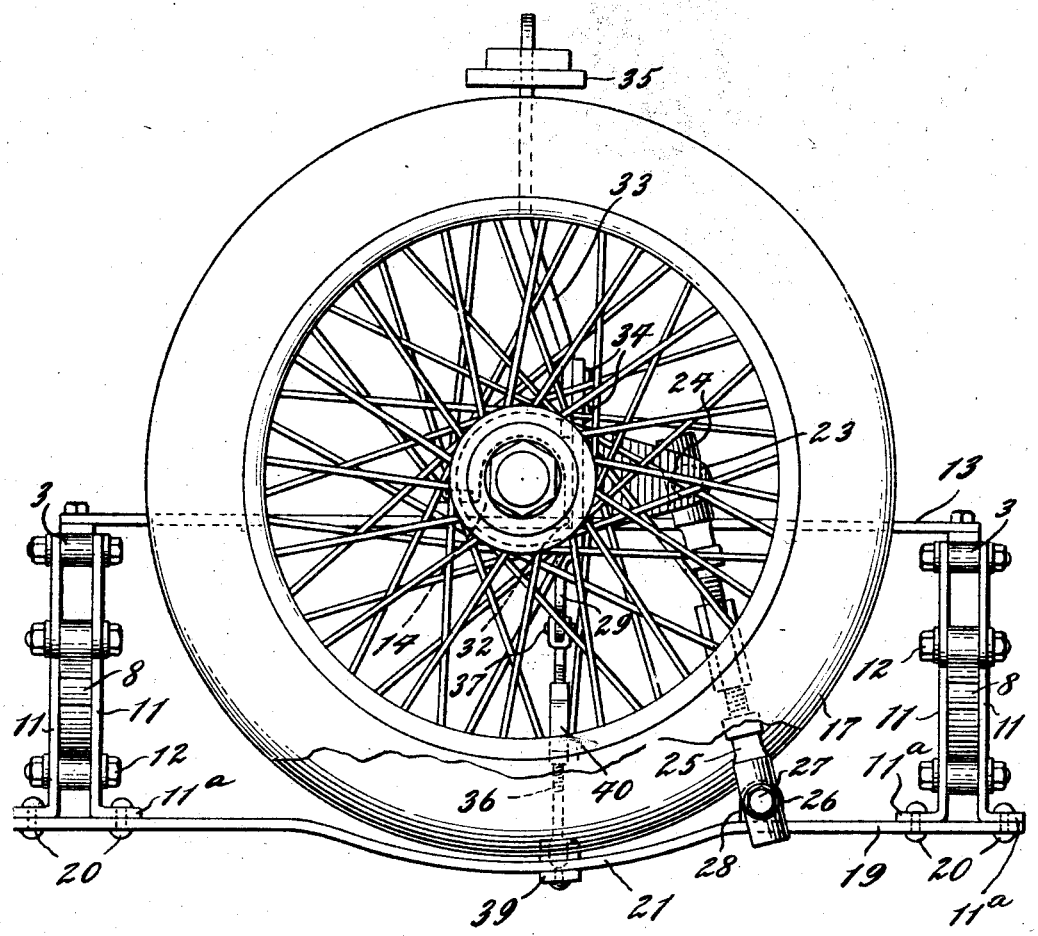
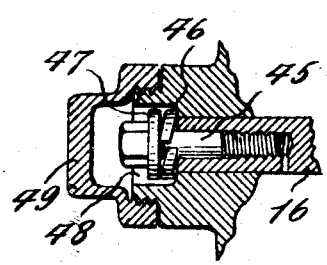

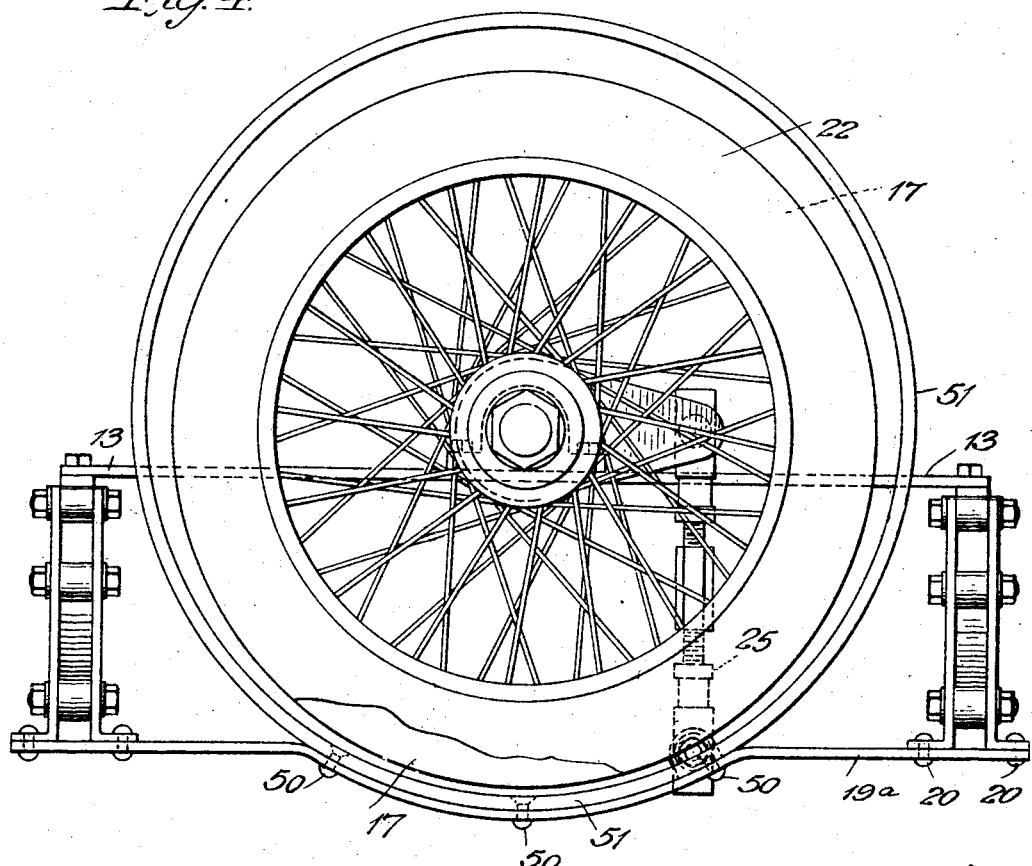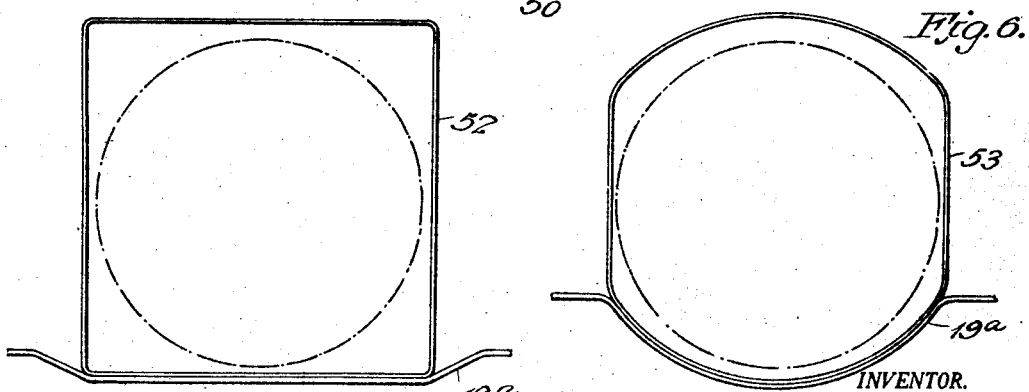

1,630,062

UNITED STATES PATENT OFFICE.

THOMAS J. FAY, OF BROOKLYN, NEW YORK.

VEHICLE.

Application filed November 2, 1923. Serial No. 672,246.

This invention relates to vehicles and has for an object to provide improved means for controlling the relative movements between the chassis frame and axle in such a manner as to improve the riding qualities of the vehicle and prevent excessive and violent relative movements between the frame and axle such as are caused by the unevenness of the roadway over which the vehicle is travelling. A further object is to provide a device for accomplishing this result, which will be relatively simple, inexpensive, and readily applicable to existing types of vehicle constructions without material changes in their design. Other objects and advantages will be apparent from the following description of an embodiment of the invention and the novel features will be particularly pointed out hereinafter in claims.

In the accompanying drawing,

Fig. 1 is a side elevation partly in section of the rear end of a vehicle constructed in accordance with the invention;

Fig. 2 is a sectional end elevation of the same, the section being taken substantially along the line 2—2 of Fig. 1, Fig. 3 is a sectional elevation of details.

Fig. 4 is an end elevation of a vehicle constructed in accordance with the invention and illustrates a modification of the invention, and, Figs. 5 and 6 are diagrammatic elevations of further modifications of the invention.

Fig. 7 is a side elevation partly in section of the rear end of a vehicle constructed in accordance with this invention, similar to Fig. 1, but illustrating the full connection of the main spring.

In the embodiment of the invention illustrated in Figs. 1 to 3, the vehicle body 1 is supported upon the chassis frame 2, having suspension members 3 extending rearwardly therefrom at each side. A pair of bearing blocks 4 are disposed upon opposite sides of the rear axle 5 at each side of the vehicle, and each pair are secured together in engagement with the sleeve or shell 6 of the axle, in any suitable manner, such as by double ended bolts 6ª passing through the blocks 4, with their heads between the blocks and nuts 7 threaded upon their outer ends for clamping the bearing blocks to one another and to the axle. A pair of leaf spring elements 8 and 9 are clamped to the bearing blocks upon opposite sides of the axle on each side of the vehicle, by the bolts 6ª and nuts 7 which also serve to clamp the bearing blocks to the axle, one of the spring elements such as 9, at each side of the vehicle extending forwardly and having an articulated connection to the chassis frame.

The spring elements at each side of the vehicle extend rearwardly from the axle in superposed relation and beneath the suspension members 3 of the chassis frame. The spring elements 8 extend rearwardly to a greater extent than the elements 9 and have articulated connections to links 10 which are also articulately connected to the rear ends of the suspension members 3. A pair of gathering plates 11 are disposed in vertical directions upon opposite sides of each superposed pair of spring elements 8 and 9, and are connected to one another by bolts 12. The longer leaf spring of the spring element 9 is turned into an eye through which one of the bolts 12 passes, and one of the shorter leaves of the spring element 8 is turned into an eye through which another of the bolts 12 passes. The bolts 12 are so positioned upon the gathering plates that when the latter are connected to the spring elements, the latter will be flexed toward one another with considerable force, such as approximately 800 pounds.

A pair of cross bars 13 extend between and connect the suspension members 3 at opposite sides of the vehicle, and are adapted to carry and support suitable bearing blocks 14 and 15 which support a bearing shaft 16 that extends rearwardly from the chassis frame. A pneumatic tire 17 is supported in an inflated condition upon a carrier 18 which may, as illustrated, conveniently comprise a spare wheel of the vehicle, the carrier or spare wheel being preferably rotated or supported upon the shaft in a substantially vertical plane, transversely of the vehicle.

A buffer device 19 is secured in any suitable manner, such as by rivets 20, the flanges 11ª provided upon the lower ends of the gathering plates 11. The buffer device extends between and connects the pairs of gathering plates at the opposite sides of the vehicle, and has an intermediate portion 21 which extends directly below the tire 17 and has a concave upper surface with a radius of curvature greater than that of the outer periphery of the tire. The arcuate portion 21 of the buffer device is preferably slightly spaced from the periphery of the tire when the vehicle has its normal loading, such as with a space of approximately one-half inch, although this distance is given merely by way of example and is not to be considered as a strict limitation. With this arrangement, the intermediate arcuate portion of the buffer device and the lower strip of the tire periphery will diverge from one another upon opposite sides of a central or intermediate point in the length of the buffer device.

The shaft 16 extends rearwardly beyond the wheel or carrier 18 and is adapted to rotatably support an inertia element 22. The inertia element may conveniently comprise a spare wheel with a spare tire, or the spare tire mounted upon a suitable carrier which is in turn rotatably mounted upon the shaft. A crank arm 23 is connected to the inertia element and at its free end has a universal connection 24 to one end of a link 25, the other end of the link having a universal connection 26 to a pin 27 which is carried by an ear 28 extending from one edge of the buffer device 19. Since the buffer device moves with the axle and the lower members of the spring suspension, and the inertia element moves with the chassis frame, the inertia element will be oscillated when the chassis frame and axle have relative movements toward and from one another. The crank arm 23 of the inertia element is preferably substantially horizontal when the vehicle has its normal loading. It will be understood that instead of the crank arm, the link or connecting rod 25 may be connected directly to the inertia element at one side of the shaft 16, and the link 25 may be adjustable in length so as to place the crank arm horizontal when the vehicle has a particular loading.

A lever 29 is hinged at 30 to a bracket 31 carried by the chassis frame 2, the lever extending rearwardly of the chassis frame into proximity to the pneumatic tire 17, and then upwardly through a guide slot 32 in one of the bearing blocks 14 of the shaft 16 slightly at one side of the shaft 16, there being sufficient clearance in the slot to permit of the vertical oscillations of the lever. A flat leaf or spring bar 33 is secured in any suitable manner, such as by rivets 34, to the upper end of the vertical arm of the lever 29 so as to form a vertical extension thereon, the bar being elongated in cross section so as to be somewhat flexible in a direction transversely of the vehicle, and substantially rigid against flexure in a direction lengthwise of the vehicle.

The upper end of the spring or leaf bar 33 is turned rearwardly over the upper edge of the tire 17 and carries a contact plate 35 normally in slightly spaced relation to the periphery of the tire 17 when the vehicle has its normal loading. A link 36 is hinged at 37 to the lever 29 rearwardly of its pivot 30, and is connected by a pivot pin 38 to an arm 39 secured to the buffer element 19 intermediate its ends. The link 36 preferably has included therein a turn buckle 40 or equivalent structure by which the effective length of the link may be varied for the purpose of normally placing the lever 29 in a position in which the plate 35 carried at its upper end will have a desired spacing from the periphery of the tire 17.

I preferably retard the movements of the inertia element 22 by frictional means. To this end, a split abutment collar 41 may be clamped securely to the shaft 16 between the wheel 18 and the inertia wheel, the collar serving to confine the wheel 18 against a suitable abutment 42 on the shaft. The rear end of the collar has a flange 43, and a friction disc 44 is interposed between the inertia wheel 22 and the flange 43. The rear end of the shaft is internally threaded, and receives a bolt 45 therein. A split spring washer 46 and an ordinary disc washer 47 are disposed upon the bolt between its head and the end of the shaft, with the split washer adjacent the end of the shaft. Both of the washers are of larger diameter than the shaft and are received within a recess 48 in the rear end of the hub of the inertia element so that when the bolt is screwed further into the shaft, the washers will be compressed against the inertia wheel and force it against the friction disc 44, the split washer acting as a spring to compensate for any slight wear as the inertia wheel oscillates. A hub cap 49 detachably carried by the hub of the inertia wheel conceals the bolt and washers.

In the embodiment of the invention illustrated in Fig. 4, the buffer plate 19ª, corresponding to the plate 19 of the aforedescribed embodiment, has secured to the concave portion thereof in any suitable manner such as by rivets 50, a buffer ring or frame 51 of a diameter slightly larger than that of the tire 17, and this ring or frame peripherally surrounds the tire 17 so as to control and limit relative vertical and lateral movements of the axle and chassis frame. In this form of the invention, the lever 29 such as used in the embodiment illustrated in Fig. 1, is eliminated, similar action being obtained by the engagement of the tire with the upper part of the buffer ring.

In Figs. 5 and 6 different forms that the buffer ring or frame may take are illustrated. In Fig. 5, the ring or frame 52 is rectangular, practically square.

In Fig. 6, the frame 53 is circular except that opposite sides are flat so that little lateral play between the tire and the sides will be permitted, and the usual or desired vertical play provided for. Obviously various other shapes and sizes for the buffer frame or ring may be utilized within the principle of the invention. The buffer ring or frame, in all of its forms, will serve to control the relative vertical and careening movements of the chassis frame and axle.

In the operation of a vehicle constructed in this manner, as the vehicle moves over a roadway, the unevenness of the latter will cause relative approaching and separating movements between the axle and chassis frame. The tire 17 and the inertia element 22, by reason of their support upon the chassis frame, will partake of the movements of the chassis frame, and the buffer device 19, by reason of its support from the lower suspension members connected to the axle will partake largely of the relative movements of the axle. The relative movements of the frame and axle will therefore, through the link 25 and the crank arm 23, cause oscillation of the inertia element 22, and the latter, by its inertia, will tend to retard or check the relative movements in such a manner as to prevent rapid, sharp or excessive movements of either the axle or chassis frame relatively to the other, with the result that such relative movements as occur between the axle and chassis frame will be relatively slow and easy. The oscillations of the inertia element or wheel will be affected not only by the inertia of the element or wheel, but also by the friction between the element and the disc 44. The degree of frictional resistance may be varied by the adjustment of the bolt 45.

In case the relative approach of the chassis frame and axle exceeds an extent corresponding to the minimum spacing between the buffer device 19 and the lower peripheral edge of the tire 17, the buffer device will engage the inflated tire 17 and be retarded by the resiliency of the tire. The extent of this retarding action will increase proportionately with the extent of approach between the axle and frame after contact of the buffer device with the tire has been established. In view of the fact that the arcuate portion 21 of the buffer device diverges on each side, relatively to the tire periphery, the greater the approach between the buffer device and the tire, the greater will be the area of contact between the arcuate portion and the tire, and consequently the greater will be the resistance of the approaching movement. It will thus be observed that the resistance by the buffer device to relative approaching movements between the axle and frame will be proportionate to the degree of movement after contact has been established.

When the axle and chassis frame separate, the lever 29 will be pulled downwardly by reason of its link connection 36 to the buffer device, and the plate 35 carried upon the upper end of the lever will engage with the upper peripheral portion of the tire 17, the tire by its resiliency opposing the downward movement of the lever 29. The upward migrations of the chassis frame, relatively to the axle beyond an extent proportional to the normal spacing between the plate 35 and the tire 17 will be resisted by the resiliency of the tire, the resistance becoming progressively greater with increases in the extent of migration of the chassis frame.

I have found, by actual operation of a vehicle having a construction corresponding to this invention, that the inertia element, the buffer device 19, and the lever 29 all cooperate together to control the relative migrations of the axle and chassis frame in a manner to check or "iron out" the relative movements and cause the vehicle to ride very smoothly and evenly over very uneven or rough roadways without seriously lessening the sensitiveness of the suspension device to the minor variations in the unevenness of the roadway.

By reason of the greater radius of curvature of the upper surface of the buffer device relatively to the radius of curvature of the outer periphery of the tire, when one side of the axle moves vertically to a greater extent than the other, the arcuate portion of the buffer device will rock about the center of curvature of the tire so as not to engage the tire unless the relative movement of the axle is excessive. When the chassis frame careens sidewise, the tire 17 will engage with the concave surface of the buffer device and create a resistance to the careening movement of the frame. The resistance to the careening will be proportional to the angle the normal to the tire at the point of contact makes with the horizontal, and since the normal approaches the horizontal as the careening increases in extent, the resistance will become greater proportionally to the increases in extent of careening. By reason of the flexibility of the upward extension 33 of the lever, the plate 35 will, during the unequal movements of the opposite sides of the axle, impart small increments of rotary movement to the tire 17, with the result that such wear upon the tire as occurs will be uniformly distributed around the tire periphery. I have also found that since the relative movement vertically between the frame or axle is not always exactly equal on both ends of an axle, the mere contact established and broken at intervals between the buffer frame and tire will cause the tire and its carrier to be rotated so as to distribute any wear upon the tire.

The use of frictional resistance alone for controlling the relative migrations of the chassis frame has never given very satisfactory results, for among other objections the sensitiveness of the spring suspension was materially reduced. The use of the friction in the manner disclosed herein for controlling the movements of the inertia element that is used to control the relative migrations of the chassis frame, has been found very satisfactory, and a vehicle having these controls of the chassis frame is remarkably easy riding.

It will be obvious that various changes in the details and arrangements of parts, herein described and illustrated for the purpose of explaining the nature of the invention, may be made by those skilled in the art within the principle and scope of the invention as expressed in the appended claims.

Claims:

1. In a vehicle having a chassis frame and axle, a pneumatic device supported by the chassis frame, a part moving with the axle and cooperating with said device to yieldingly resist relative movements between the axle and chassis frame, a lever hinged to the chassis frame, and an element moving with the axle and connected to the lever to oscillate it upon relative movements between the axle and chassis frame, the movements of said lever being resisted by said pneumatic device during the relative movements of the chassis frame and axle which are unresisted by the said part and the pneumatic device.

2. In a vehicle having a chassis frame and axle, a pneumatic tire, a carrier for said tire supported on the frame in a vertical position, a part moving with the axle and engaging against the lower edge of the tire when the chassis frame and axle approach one another, a lever hinged to the chassis frame and overlying the tire, and an element moving with the axle and connected to the lever to cause it to engage with the tire upon separation of the chassis frame and axle.

3. In a vehicle having a chassis frame and axle, a suspension between the frame and axle including spring means connected to the axle, a pneumatic tire, a carrier for said tire supported on the frame in a substantially vertical position, and a part connected to the spring means at a distance from their connection to the chassis frame and having a portion thereof within the path of the tire to be engaged by the tire when the chassis frame and axle approach one another.

4. In a vehicle having a chassis frame and axle, a suspension between the frame and axle including spring means connected to the axle, a pneumatic tire, a carrier for said tire supported on the frame in a substantially vertical position, a part connected to the spring means at a distance from their connection to the chassis frame and having a portion thereof within the path of the tire to be engaged by the tire when the chassis frame and axle approach one another, a lever hinged to the chassis frame and overlying the tire, and an element moving with the axle and connected to the lever to cause it to engage with the tire upon separation of the chassis frame and axle, whereby the tire will yieldingly resist excessive relative movements in both directions between the frame and axle.

5. In a vehicle having a chassis frame and an axle, suspension members attached to the frame and extending endwise thereof, spring devices carried by the axles, extending therefrom below the suspension members, and articulately connected thereto, a pneumatic tube, a carrier for said tube supported on the frame in a substantially vertical position, a member extending beneath the tube and connected to the spring devices on opposite sides of the vehicle between their connections to the axle and suspension members whereby when the frame and axle approach one another the member beneath the tube and moving with the axle will engage with, and be retarded by the tube.

6. In a vehicle having a chassis frame and an axle, a substantially horizontal shaft carried by the rear end of the chassis frame, an inflated pneumatic tire, a carrier for said tire rotatably supported on said shaft, an inertia member also rotatably carried by the shaft, a member extending beneath and slightly spaced from said tire and moving vertically concomitantly with the axle, and means also moving vertically concomitantly with the axle and connected to the inertia element to rotate it upon relative approaching and separating movements of the axle and frame whereby the minor relative movements of the axle and frame will be resisted by the inertia element and the major excessive movements resisted by both the inertia element and the tire.

7. In a vehicle having a chassis frame and an axle, a spring suspension device between the axle and frame, a pneumatic tire, a carrier for said tire supported in a substantially vertical position from the frame and in proximity to the suspension device, and a buffer device extending transversely of the vehicle, connected between the lower parts of the suspension device on opposite sides of the vehicle and passing below the tire whereby the excessive relative movements between the frame and axle will be resisted by the pneumatic tire acting against the buffer device.

8. In a vehicle having a chassis frame and an axle, a spring suspension device between the axle and frame, a pneumatic tube, a carrier for said tube supported transversely of the vehicle in a substantially vertical position from the frame and in proximity to the suspension device, and a buffer device extending transversely of the vehicle, connected between the lower parts of the suspension device on opposite sides of the vehicle and passing below the tube whereby the excessive relative movements between the frame and axle will be resisted by the pneumatic tire acting against the buffer device, the buffer device and tube diverging relatively to one another on each side of an intermediate point.

9. In a vehicle having a chassis frame and an axle, a spring suspension device between the axle and frame, a pneumatic tire, a carrier for said tire, a shaft extending lengthwise of the frame and mounting said carrier, a buffer device extending transversely of the vehicle and connected between the lower parts of the suspension at opposite sides of the vehicle, said device passing below the tire whereby the excessive relative movements between the frame and axle will be resisted by the pneumatic tire acting against the buffer device, the upper surface of the portion of the buffer device extending below the tire being concave with a radius of curvature greater than the radius of the periphery of the tire.

10. In a vehicle having a chassis frame and an axle, a spring suspension device between the axle and frame, a pneumatic tire, a carrier for said tire, a shaft extending lengthwise of the frame and mounting said carrier, a buffer device extending transversely of the vehicle and connected between the lower parts of the suspension at opposite sides of the vehicle, said device passing below the tire whereby the excessive relative movements between the frame and axle will be resisted by the pneumatic tire acting against the buffer device, the upper surface of the portion of the buffer device extending below the tire being concave with a radius of curvature greater than the radius of the periphery of the tire, and spaced slightly from the tire.

11. In a vehicle having a chassis frame and an axle, a spring suspension device between the axle and frame, a shaft extending rearwardly of the frame, a pneumatic tire, a carrier for the tire mounted on said shaft, an inertia element rotatably mounted on the shaft, a buffer device extending between and connecting the lower parts of the suspension on opposite sides of the vehicle, said device having a member extending below the tire for engagement therewith to resist pneumatically relative movements of the axle and frame, and a crank connection between the buffer device and the inertia element for oscillating the inertia element upon relative movements between the axle and frame.

12. In a vehicle having a chassis frame and an axle, a spring suspension device between the axle and frame, a shaft extending rearwardly of the frame, a pneumatic tire, a carrier for the tire mounted on said shaft, an inertia element rotatably mounted on the shaft, a buffer device extending between and connecting the lower parts of the suspension on opposite sides of the vehicle, said device having a member extending below the tire for engagement therewith to resist pneumatically relative movements of the axle and frame, and a crank connection between the buffer device and the inertia element for oscillating the inertia element upon relative movements between the axle and frame, said member of the buffer device being normally spaced slightly from the tire so that the inertia element will act to check all relative movements between the frame and axle, and the pneumatic tire will act through engagement with the buffer device to also check the relative movements when excessive.

13. In a vehicle having a chassis frame and an axle, a spring suspension device between the axle and frame, a device connecting the lower portions of the suspension device at opposite sides of the vehicle, a lever hinged to the frame, a connection between the lever and the said device whereby the lever will be oscillated by the relative movements between the axle and frame, an inflated pneumatic tire carried by the frame in a position to be engaged by the lever and resist movements thereof.

14. In a vehicle having a chassis frame and an axle, a spring suspension device between the axle and frame, a device connecting the lower portions of the suspension device at opposite sides of the vehicle, a lever hinged to the frame, a connection between the lever and the said device whereby the lever will be oscillated by the relative movements between the axle and frame, an inflated pneumatic tire, and a carrier for said tire rotatably mounted on the frame in a transverse substantially vertical plane, said lever having an extension acting against the periphery of the tire and flexible in the direction of rotation of the tire.

15. In a vehicle having a chassis frame part and an axle part movable relatively toward and from one another, an inflated pneumatic tire, a carrier for said tire supported by one of said parts, and a buffer device carried by the other of the parts and engageable with peripherally spaced points of the inflated tire upon relative movements of said parts in both directions, whereby said relative movements will be resisted by the resiliency of the inflated tire.

16. In a vehicle having relatively moving parts, such as the chassis frame and axle, a pneumatic tire, a carrier for said tire attached to one of said parts for movement simultaneously therewith, means carried by the other of the parts and acting against the tire to resist the approach of said parts whereby the tire forms a part of the supporting suspension between the chassis frame and axle, and means connected between the carrier and the said other of the parts for causing a movement of the carrier different from that which would be produced otherwise by the relative movement of said parts, whereby the inertia of the carrier will also resist the relative movements of the said parts.

17. In a vehicle having relatively moving parts, such as the chassis frame and axle, a pneumatic tire, a carrier for said tire rotatably attached to one of said parts for movement simultaneously therewith, means carried by the other of the parts and acting against the tire to resist the approach of said parts whereby the tire forms a part of the supporting suspension between the chassis frame and axle, and a connection between the carrier and the said other of the parts, for causing a rotation of the carrier about its axis upon relative movement between the chassis frame and axle.

18. In a vehicle having a chassis frame and axle, a suspension element connected to the chassis frame, and to the axle, and a pneumatic tire interposed between articulating faces of the element and the chassis frame for resisting their relative approach.

19. In a vehicle having a chassis frame and axle, a suspension element connected at one end to the chassis frame, and at an intermediate point to the axle, a pneumatic tire, a carrier for said tire, a support for said carrier mounted on the chassis frame so as to position the tire to press against the other end of said element and resist approach of said other end of the element and the frame.

20. In a vehicle having a chassis frame and axle, a suspension element connected to the chassis frame, and to the axle, a pneumatic tire, a carrier for said tire interposed between the articulating faces of the element and the frame with the tire resisting relative motion of said element and the frame, and means for imparting a rotary movement to the tire and carrier upon relative movement between the chassis frame and axle.

21. In a vehicle having a chassis frame and axle, a suspension element at each side of the vehicle connected at one end to the chassis frame and at an intermediate point to the axle, an abutment member extending between the other ends of the suspension elements, an inflated pneumatic tire, and a carrier for said tire supported upon the chassis frame with the tire pressing upon said abutment member to resist approach of the chassis frame and axle.

22. In a vehicle having a chassis frame and axle, a suspension element at each side of the vehicle connected at one end to the chassis frame and at an intermediate point to the axle, an abutment member extending between the other ends of the suspension elements, an inflated pneumatic tire, and a carrier for the said tire supported upon the chassis frame with the tire pressing upon said abutment member to resist approach of the chassis frame and axle, the face of the abutment member against which the tire bears being concave with the tire extending into the concavity therein.

23. In a vehicle having a chassis frame and axle, a suspension element at each side of the vehicle connected at one end to the chassis frame and at an intermediate point to the axle, an abutment member extending between the other ends of the suspension elements, an inflated pneumatic tire, a carrier for said tire rotatably supported upon the chassis frame with the tire pressing upon said abutment member to resist approach of the chassis frame and axle, and connections between the carrier and the abutment member for causing a rotary torque upon the tire upon relative movements between the chassis frame and axle.

24. In a vehicle having a chassis frame and axle, a suspension element at each side of the vehicle connected at one end to the chassis frame and at an intermediate point to the axle, an abutment member extending between the other ends of the suspension elements, a bearing mounted on the chassis frame, a tire carrier and an inertia element mounted on the bearing for rotation independently of one another, said carrier and inertia element having a frictional driving connection between them, an inflated pneumatic tire carried by the carrier for rotation therewith pressing against the abutment member to resist relative approach of the chassis frame and axle, and connections for creating a rotary torque upon the tire and carrier upon relative movements of the chassis frame and axle.

25. In a vehicle having a chassis frame part and an axle part, a suspension between the parts comprising an abutment member secured to one of the parts and having a concave face extending transversely of the vehicle, a tire carrier mounted upon the other of the parts, and an inflated pneumatic tire mounted on the carrier with its plane transversely of the vehicle and intersecting the said concave face, the tire by its engagement with said face serving to resist approach of the chassis frame and axle parts and to resiliently hold them apart.

26. In a vehicle having a chassis frame part and an axle part, a suspension between the parts comprising an abutment member secured to one of the parts and having a concave face extending transversely of the vehicle, a tire carrier mounted upon the other of the parts, an inflated pneumatic tire mounted on the carrier with its plane transversely of the vehicle and intersecting the said concave face, the tire by its engagement with said face serving to resist approach of the chassis frame and axle parts, and to resiliently hold them apart, said carrier being movable upon its mounting, and connections for applying a moving force to the carrier upon relative movement of the parts.

27. In a vehicle having a chassis frame and axle, a suspension element connected to the chassis frame, and to the axle, a pneumatic tire, a carrier for said tire interposed between the articulating faces of the element and the frame with the tire resisting relative motion of said element and the frame, means for imparting a rotary movement to the tire and carrier upon relative movement between the chassis frame and axle, and means for resisting said rotary movement.

28. In a vehicle having a chassis frame and axle, an inflated pneumatic tire carried by said frame, means encircling said tire and supported from the axle for limiting the relative movements of said frame and axle, and thereby limiting the relative movements of the frame and axle in all directions.

29. In a vehicle having a chassis frame part and an axle part, an inflated pneumatic tire carried by one of said parts, and an abutment element encircling said tire peripherally thereof and carried by the other of said parts, whereby said element by engagement with the tire will limit the relative movements of said parts.

30. In a vehicle having a chassis frame part and an axle part, an inflated pneumatic tire carried by one of said parts, and an abutment element encircling said tire peripherally thereof and carried by the other of said parts, whereby said element by engagement with the tire will limit the relative movements of said parts, the inner periphery of said abutment element being slightly greater than the outer periphery of the tire, whereby a limited relative movement of said parts will be unrestricted.

31. In a vehicle having a chassis frame and axle, suspension members connected between the frame and axle at opposite sides of the vehicle, a pneumatic tire, a carrier for said tire mounted upon the frame, a band surrounding the periphery of the tire and articulately suspended between the suspension members for limiting the movements of the frame relatively to the axle.

32. In a vehicle having a chassis frame and axle, suspension members connected between the frame and axle at opposite sides of the vehicle, a pneumatic tire, a carrier for said tire rotatably mounted upon the frame, a band surrounding the periphery of the tire and articulately suspended between the suspension members for limiting the movements of the frame relatively to the axle, and a connection between the carrier and band for causing the application of a rotary torque to the carrier upon relative movements between the frame and axle.

In witness whereof, I hereunto subscribe my signature.

THOMAS J. FAY.